United States Patent Office 3,422,451
Patented Jan. 14, 1969

3,422,451
α,α,1,6-TETRAMETHYL-3-PIPERIDINEMETHANOLS AND THEIR PREPARATION
Arthur C. Cope, Boston, and William Dickinson Burrows, Cambridge, Mass., assignors to Merck & Co., Inc., Rahway, N.J., a corporation of New Jersey
No Drawing. Filed July 13, 1965, Ser. No. 471,747
U.S. Cl. 260—294.7          4 Claims
Int. Cl. C07d 29/04; C07d 29/16

ABSTRACT OF THE DISCLOSURE

The invention relates to α,α,1,6-tetramethyl-3-piperidinemethanol and to a method of producing it by reacting 1,5-dimethyl-4-hexenylamine with the formaldehyde and formic acid in the presence of heat.

DESCRIPTION OF INVENTION

The present invention relates to α,α,1,6-tertamethyl-3-piperidinemethanols and to a process of producing the same.

A purpose of the invention is to cyclize 1,5-dimethyl-4-hexenylamine by reaction with formaldehyde and formic acid.

A further purpose is to bring about the reaction so as to produce the cis isomer as one of the reaction products.

A further purpose is to bring about the reaction so as to produce the trans isomer as one of the reaction products.

A further purpose is to produce a mixture of trans and cis compound in which the trans isomer predominates by 2:1.

Further purposes appear in the specification and in the claims.

Certain ring-substituted α-phenylethylamines cyclize during Clarke-Eschweiler methylation, and this is a special case of the Pickett-Spengler synthesis of tetrahydroisoquinolines. J. A. Castrillon, 74 J. Am. Chem. Soc., 588 (1952); R. Baltzly, 75 J. Am. Chem. Soc., 6038 (1953). For example, mescaline gives only a tetrahydroisoquinoline on reaction with formaldehyde and formic acid.

An effort was made to react 1,5-dimethyl-4-hexenylamine

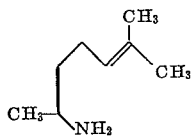

with formaldehyde and formic acid to obtain a corresponding dimethylamine.

Surprisingly, instead of this, a mixture of cis and trans, α,α,1,6-tetramethyl-3-piperidinemethanol resulted having the following formula:

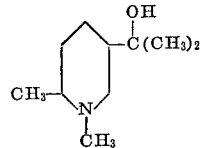

The product resulted in 75% yield as a semi-crystalline mass which was shown by vapor phase chromatography to comprise two different compounds in 2:1 ratio.

The major component is a crystalline solid of an empirical formula $C_{10}H_{21}NO$. The nuclear magnetic resonance (NMR) spectrum in carbon tetrachloride displays a 1-proton singlet (6.62τ) due to tertiary hydroxyl, a 3-proton singlet due to nitrogen-bonded methyl (7.80τ), and what appears to be a 3-proton doublet (8.93τ, J=4.5 c.p.s.) superimposed on two 3-proton singlets (8.97τ, 8.87τ) resulting from the 6-methyl and nonequivalent α-methyl groups. In the nuclear magnetic resonance spectrum of the methiodide

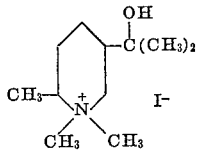

in deuterium oxide, the 6-methyl doublet (8.66τ, J=6.0 c.p.s.) is shifted downfield relative to the α-methyl singlets (8.81τ, 8.77τ) and two 3-proton singlets appear due to N-methyl (7.04τ and 6.84τ).

The Hoffmann product of the methiodide above is the terminally unsaturated amino alcohol

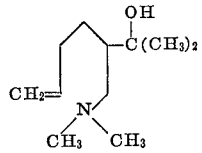

The principal features of the nuclear magnetic resonance spectrum of this compound in carbon tetrachloride are the two C-methyl singlets (8.98τ, 8.88τ); a 6-proton N-methyl singlet (7.70τ); two partially resolved multiplets (5.08τ, 4.83τ) due to the terminal vinyl protons and a broad complex multiplet (3.8 to 4.5τ) due to the other vinyl proton.

The methiodide of the above compound

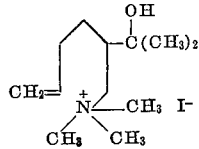

undergoes fragmentation in the Hoffmann reaction, yielding trimethylamine, acetone and 1.5-hexadiene, the last being identified by comparison of its infrared, nuclear magnetic resonance and mass spectra with those of the authentic material. These results establish the structure of the major component of the reaction as that given above.

The minor liquid product of the reaction is the stereoisomer, since it has the same formula and gives the same Hoffmann product. In the nuclear magnetic resonance spectrum of the minor methiodide in deuterium oxide the 6-methyl doublet (8.54τ, J=7:5 c.p.s.) and N-methyl singlets (6.88τ, 6.75τ) appear further downfield than in the spectrum of the major methiodide and the α-methyl groups are not differentiated (8.76τ).

The stereoisomeric amino alcohols are interconverted by hot aqueous sulphuric acid. Equilibration is not achieved since extensive deposition accomplishes epimerization, but from either isomer there is obtained a mixture in which the crystalline form predominates by 2:1 or greater. Because the diequatorial isomer is predicted to be more stable, we have assigned the trans configuration to the major (crystalline) component.

Without limiting the present patent to the assumption that the following theoretic discussion is correct, it seems probable that the first step in the Clarke-Eschweiler methylation of 1,5-dimethyl-4-hexenylamine (compound 1 below) is normal, giving the monoethylated intermediate (compound 2) which reacts with formaldehyde to give the iminium cation (compound 3). This compound cyclizes to yield the tertiary combonium ion (compound 4). This by reaction with water produces α,α-1,6-tetramethyl-3-piperidinemethanol in the cis and trans admixture as above referred to. The intermediate (compound 4) must have considerable carbonium ion character, since 1-methyl-4-pentenylamine which is listed below (compound 5), lacking the terminal methyl groups, gives the N,N-dimethyl derivative rather than the cyclization product on treatment with formaldehyde and formic acid.

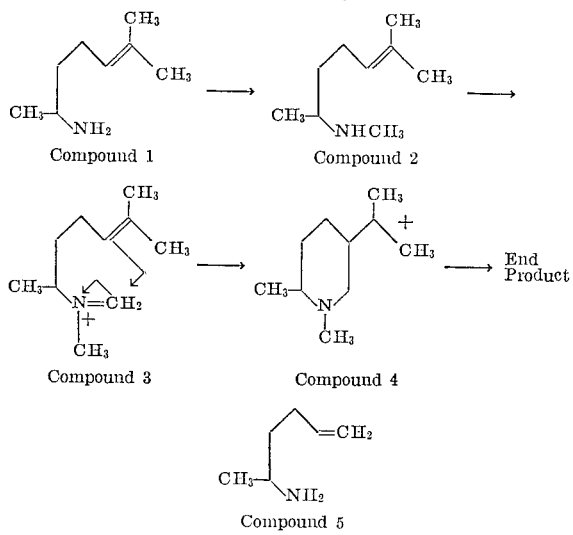

EXAMPLE 1

1,5-dimethyl-4-hexenylamine

The preparation of this amine was first described by O. Wallach, 309 Ann., 25 (1899). 6 - methyl - 5 -hepten-2-one was prepared from citral in the usual way and converted to the oxime. The oxime (64.5 grams, B.P. 86–90° C. at 3 mm.) dissolved in 150 ml. of anhydrous tetrahydrofuran was added dropwise with stirring to a solution of 18 grams of lithium aluminum hydride in 250 ml. of anhydrous tetrahydrofuran. The mixture was refluxed for 40 hours and then the following ingredients were added to the refluxing mixture successively with stirring: 18 ml. of water, 18 ml. of 15% sodium hydroxide in water, 54 ml. of water. The tetrahydrofuran layer was removed, dried over magnesium sulphate, evaporated and distilled, yielding 36 grams (62%) of an oil, boiling point 70–80° C. (18 mm.).

EXAMPLE 2

Cis- and trans-α,α,1,6-tetramethyl-3-piperidinemethanol

The above amine obtained in Example 1 (36 grams) was added with cooling to 72 grams (5 molar equivalents) of 91% formic acid. To this was added 70 grams (3 molar equivalents) of 37% formaldehyde in water. After initial gas evolution had subsided the solution was heated on a steam bath for 5 hours. The solution after cooling was poured into a mixture of 100 grams of ice and 20 ml. of concentrated hydrochloric acid, and extracted with ether. The extract was discarded and the aqueous portion was made strongly basic with solid sodium hydroxide. The oil that separated was removed by extraction with ether. The extract was dried over magnesium sulphate, evaporated and distilled, yielding 36.2 grams (75%) of an oil, boiling point 75–95° C. (2.5 mm.). The later fractions crystallized in the condenser. This material was shown by vapor phase chromatography on a 60 cm. silicone rubber column to comprise two components of 2:1 ratio, the major component having a somewhat longer retention time. The solid material was removed by filtration and recrystallized from ether to obtain a product having a melting point of 80–81° C.

The calculated analysis for $C_{10}H_{21}NO$ is as follows: C, 70.12%; H, 12.36%; N, 8.18%. The analysis found by Scandinavian Microanalytical Laboratory, Box 25, Herlev, Denmark, was as follows: C, 69.99%; H, 12.22%; N, 8.12%.

The methiodide which has been referred to above was prepared by cautious dropwise addition of an excess of methiodide to the amino alcohol and recrystallized from ethanol-acetone to a melting point of 196–198° C. Its calculated analysis for $C_{11}H_{24}NOI$ was as follows: C, 42.18%; H, 7.73%; N, 4.47%. The analysis found was as follows: C, 42.00%; H, 7.71%; N, 4.51%.

After repeated distillation the liquid fractions finally gave an oil of boiling point 70–75° C. (2.5 mm.) which contained 90–95% of the minor component. The methiodide prepared as above and recrystallized from absolute ethanol had a melting point of 255° C. (dec.).

The calculated analysis for $C_{11}H_{24}NOI$ was as follows: C, 42.18%; H, 7.73%; N, 4.47%. The analysis found was as follows: C, 42.25%; H, 7.75%; N, 4.31%.

EXAMPLE 3

3-dimethylaminomethyl-2-methyl-6-hepten-2-ol

The methiodide of the major component (1.90 grams) was dissolved in distilled water and stirred with freshly prepared silver oxide. The mixture was filtered and the filtrate was concentrated to a syrup under reduced pressure. Decomposition of the hydroxide was carried out at about 150° C. and 0.3 mm. in a small distallation apparatus connected to a receiver that was immersed in a Dry Ice-acetone bath. The product was rinsed out with ether, dried, evaporated and redistilled, yielding 0.85 gram (75%) of oil, boiling point 50° C. (0.5 mm.). The methiodide was prepared as before and recrystallized from acetone, the product having a melting point of 163–164° C.

The analysis calculated for $C_{12}H_{26}NOI$ is as follows: C, 44.04%; H, 8.01%; N, 4.28%. The analysis found was: C, 44.09%; H, 8.00%; N, 4.13%. The methiodide of the minor Clarke-Eschweiler product was converted in 75% yield by the same procedure to the same product identified by its vapor phase chromatography retention time and infrared spectrum.

EXAMPLE 4

The Hofmann reaction of 3-dimethylaminomethyl-2-methyl-6-hepten-2-ol methiodide

The methiodide obtained from Example 3 (0.55 gram) was converted to the hydroxide and decomposed as above yielding a volatile fluid smelling strongly of trimethylamine. The product was shaken with a few drops of 3 N hydrochloric acid, the aqueous layer was removed with a syringe, and a small piece of disiccant (Drierite) was added to the product. Distillation from a water bath gave 55 mg. of liquid with a mass spectrum identical to that of 1,5-hexadiene (American Petroleum Institute Research Project 44, Mass Spectral Data, 243, Chemical and Petroleum Research Laboratory, Carnegie Institute of Technology, Pittsburgh, Pa., October 1958) except for bands at m/e 58 and 43 due to the presence of acetone. Comparison of the nuclear magnetic resonance spectrum with that of authentic 1,5-hexadiene indicated that acetone ($\tau=7.93$ p.p.m.) is present to the extent of about 10 mole percent.

EXAMPLE 5

Interconversion of piperidinemethanols

A 0.50 gram sample of the amino alcohol containing 90% by weight of liquid isomer and 10% by weight of solid isomer was dissolved in 10 grams of 60% aqueous sulphuric acid and heated on a steam bath for 24 hours. The mixture was made strongly basic with solid sodium hydroxide and extracted with ether. Evaporation of the extract left 0.28 gram of oil which largely crystallized and which was shown by vapor phase chromatography to contain 50% by weight of solid isomer, 32% liquid isomer and 18% of more volatile materials. The solid was recrystallized from ether and identified by its infrared spectrum. After a 48 hour heating period, a slightly higher proportion of solid isomer was obtained, but with lower overall recovery.

A 0.35 gram sample of pure solid isomer treated similarly after 48 hours heating gave 0.16 gram of material containing 88% by weight of solid isomer and 7% of liquid isomer.

EXAMPLE 6

Clarke-Eschweiler reaction of 1-methyl-4-pentenylamine

This amine described as compound 5 above, was prepared from allylacetone by reduction of the oxime with lithium aluminum hydride as described above in Example 1. It is a known compound (J. Von Braun and F. Stechele, 33 Ber., 1472 (1900)). The amine (8.5 grams) was dissolved in 24 grams of 91% by weight formic acid and 24 grams of 37% by weight formaldehyde in water was added. The solution was heated on a steam bath for 6 hours and then poured onto ice and made strongly basic with solid sodium hydroxide. Extraction with ether and evaporation and distillation of the extract gave 6.3 grams (60%) of material with a boiling point of 135–140° C., shown by its infrared, nuclear magnetic resonance and mass spectra to be N,N-1-trimethyl-4-pentenylamine. Two higher boiling components, totalling 1.0 gram, were not identified but shown by their infrared spectra to have terminal vinyl groups.

There was no evidence of cyclization in this experiment.

EXAMPLE 7

Mass spectra of cis and trans α,α,1,6-tetramethyl-3-piperidinemethanol

Mass spectra were obtained for the major and minor Clarke-Eschweiler product using a C.E.C. Type 21–130 spectrometer. For the minor component the sample was prepared by vapor phase chromatography of a 90% by weight mixture on a 60 cm. silicone rubber column. There was no significant difference in the spectra of the two isomers. The molecular ion peak appears at m/e=171 and the base peak at m—15.

Two stable ions, as set forth below

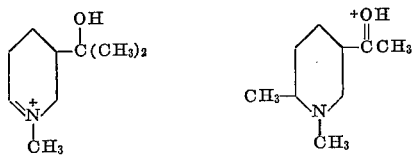

could result from the loss of CH₃. It is probable that both are formed. There are two remaining strong peaks at m/e 100, m—33 and m—59. The first properly corresponds to a loss of water by the first of these ions. The second is presumably the result of loss of the hydroxypropyl radical from the molecular ion.

EXAMPLE 8

Nuclear magnetic resonance spectra

These spectra were obtained using the Varian Model A60 spectrometer. The internal standards were tetramethylsilane for carbon tetrachloride solutions and the sodium salt of α-trimethylsilylpropanesulfonic acid for deuterium oxide solutions.

EXAMPLE 9

Both cis and trans α,α,1,6-tetramethyl-3-piperidinemethanols react with acids such as benzoic acid, diphenylacetic acid, chlorodiphenylacetic acid, and dimethylcarbamic acid to form esters. These compounds are generally useful as local anesthetics and in some cases as antispasmodics, administration being parenterally. The products are also useful to form complexes with salts of heavy metals, in a manner similar to those complexes formed by piperidine.

The products of the invention are also useful as intermediates for preparing crystalline derivatives of aromatic nitro compounds containing a nuclear halogen atom, in a manner similar to the known reaction obtained by piperidine.

The compounds of the invention are also effective as rubber accelerators.

In view of our invention and disclosure, variations and modifications to meet individual whim or particular need will doubtless become evident to others skilled in the art to obtain all or part of the benefits of our invention without copying the process and compound shown, and we, therefore, claim all such insofar as they fall within the reasonable spirit and scope of our claims.

Having thus described our invention what we claim as new and desire to secure by Letters Patent is:

1. A process of producing an α,α,1,6-tetramethyl-3-piperidinemethanol which comprises reacting 1,5-dimethyl-4-hexenylamine with formaldehyde and formic acid in the presence of heat to bring about cyclization.
2. α,α,1,6-tetramethyl-3-piperidinemethanol.
3. Cis α,α,1,6-tetramethyl-3-piperidinemethanol.
4. Trans α,α,1,6-tetramethyl-3-piperidinemethanol.

References Cited

UNITED STATES PATENTS

| | | | |
|---|---|---|---|
| 2,739,968 | 3/1956 | Sperber et al. | 260—294.7 |
| 2,739,969 | 3/1956 | Sperber et al. | 260—294.7 |
| 2,830,057 | 4/1958 | Hoffman et al. | 260—294.7 |
| 3,153,046 | 10/1964 | Hoffman et al. | 260—294.7 |
| 3,178,407 | 4/1964 | Hoffman et al. | 260—294.7 |

HENRY R. JILES, *Primary Examiner.*

ROBERT T. BOND, *Assistant Examiner.*

U.S. Cl. X.R.

252—408; 260—293, 792